R. P. VAN HORNE.
Cultivator.
No. 28,523.
Patented May 29, 1860.
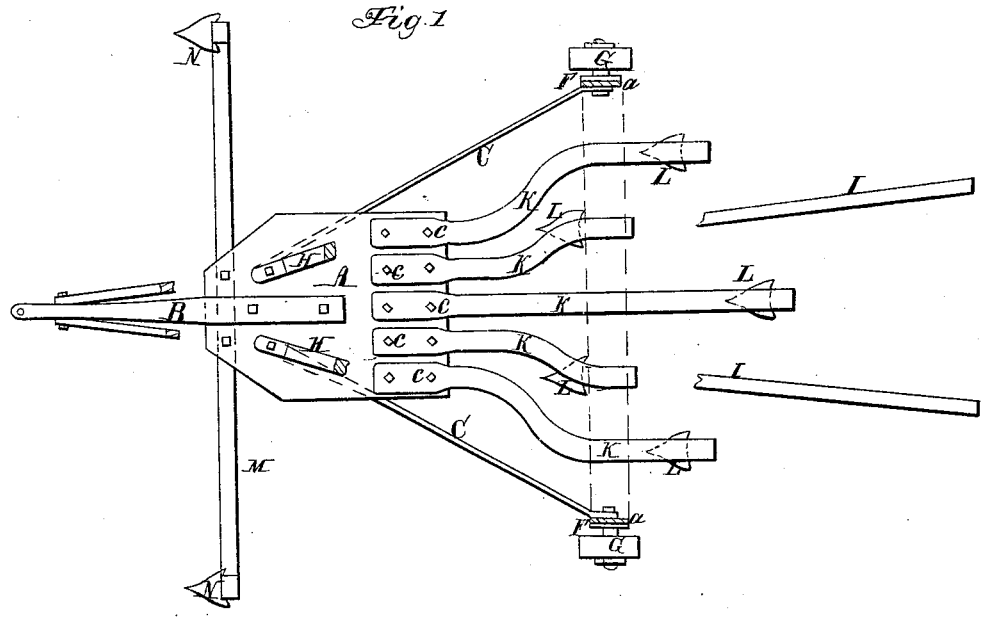
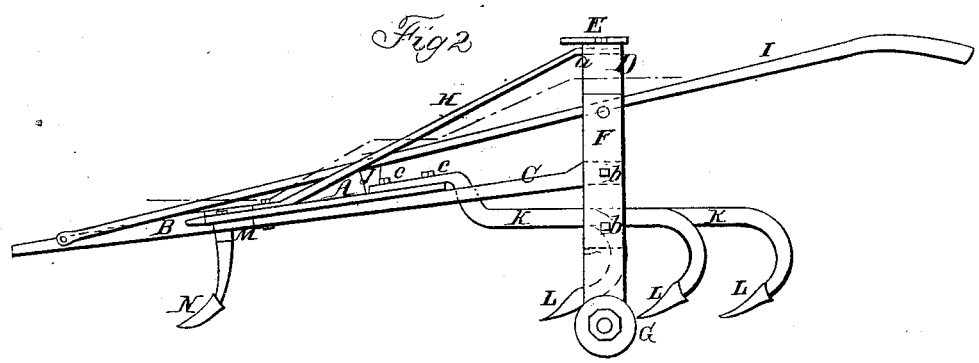
Witnesses:
R. S. Spencer
J. W. Coombs
Inventor:
R. P. Van Horne
per Munn & Co.
Attorneys

UNITED STATES PATENT OFFICE.

R. P. VAN HORNE, OF GRATIOT, OHIO.

IMPROVEMENT IN CULTIVATORS.

Specification forming part of Letters Patent No. 28,523, dated May 29, 1860.

*To all whom it may concern:*

Be it known that I, R. P. VAN HORNE, of Gratiot, in the county of Licking and State of Ohio, have invented a new and Improved Cultivator; and I do hereby declare that the following is a full, clear, and exact description of the same, reference being had to the annexed drawings, making a part of this specification, in which—

Figure 1 is a plan or top sectional view of my invention, *x x*, Fig. 2, indicating the plane of section. Fig. 2 is a side view of the same.

Similar letters of reference indicate corresponding parts in the two figures.

The object of this invention is to obtain a simple and cheap implement, which may be readily adapted for the various kinds of work required in the cultivation of different crops, such as the eradicating of weeds, the pulverizing of the soil, and the plowing of the growing plants.

The invention consists in a novel arrangement of tooth-bars attached to a plate, the latter being connected to a bar provided with adjustable wheels, substantially as hereinafter described, whereby the desired end is attained.

To enable those skilled in the art to fully understand and construct my invention, I will proceed to describe it.

A represents a metallic plate, to the front end of which a draft-bar, B, is attached. C C are two oblique bars, the front ends of which are secured to the plate A, one at each side, and the back ends of the bars C C are attached to the vertical parts *a a* of a bent bar, D, the horizontal part of which has a driver's seat, E, secured to it at its center.

To each vertical part *a* of the bar D an upright bar, F, is secured by screw-bolts *b*. These bars F have each a wheel, G, at their lower ends.

H H are braces, which extend from the plate A to the horizontal part of the bar D; and I I are handles, the front ends of which are attached to the draft-bar B, said handles being connected to the support J on the plate A. To the plate A a series of bars, K, are attached by belts *c*. These bars are of different lengths, as shown clearly in Fig. 1. Five bars, K, are shown in Fig. 1; but more or less may be used, as desired. The back parts of the bars K are curved downward in hook form, as shown in Fig. 2, and to the lower part of each bar a tooth or share L is attached.

The teeth or shares L may be of any proper form, according to the work required to be done. For ordinary cultivation—such as the eradication of weeds and pulverizing of the soil—the ordinary cultivator-tooth may be employed; but for plowing so as to throw the soil either toward or from the plants the plow-shaped tooth should be used. In plowing plants in hills or drills, the center bars (one or more of them) should be removed, so that those at the sides may operate each side of a row, and a row plowed at one operation or passage of the machine.

When the improvement is used for furrowing the side bars are removed, the center one left, and a traverse-bar, M, attached to the front part of the plate A, said bar having a share or tooth, N, at each end. By this arrangement three furrows may be made at once. If one furrow is only to be made, the back central bar is left attached to the plate.

The teeth or shares may be made to penetrate the earth a greater or less distance by adjusting the bars F, to which the wheels G are attached, the vertical plates *a a* of the bar D being provided with a series of holes to receive the bolts *b*, and these bars may be so adjusted as to elevate the teeth or shares entirely above the ground and admit of the implement being readily drawn from place to place.

When it would be most desirable the attendant walks behind the machine and grasps the handles I I.

The device, with the exception of the handles I, the bar M, and the bars D F F, may be of iron, the above-named parts being of wood.

The attaching of the bars K to the plate A, having a draft-bar connected to it, and a wheel or truck bar, D, forms an exceedingly simple device, and one which admits of the ready attachment to and removal from the machine of the bars K, so that more or less bars may be used, and the machine readily adapted to suit the work required of it. The machine also may be cheaply constructed and in a very durable manner.

Having thus described my invention, what I claim as new, and desire to secure by Letters Patent, is—

1. The arrangement of the plate A, draft-bar B, tooth or share bars K, and truck or wheel bars D, substantially as and for the purpose set forth.

2. In connection with the plate A, draft-bar B, share-bar K, and truck or wheel bar D, the traverse-bar M, provided with teeth or shares N, substantially as and for the purpose specified.

R. P. VAN HORNE.

Witnesses:
P. S. WESTBROOK,
S. R. TUCKER.